(12) United States Patent
Takahashi et al.

(10) Patent No.: US 6,342,243 B1
(45) Date of Patent: Jan. 29, 2002

(54) METHOD OF FATTENING UP A RUMINANT

(75) Inventors: Michio Takahashi, Chiba; Toru Sawasaki, Ibaraki; Masaru Otani; Shinichi Suzuki, both of Tokyo, all of (JP)

(73) Assignee: Ajinomoto Co., Inc., Tokyo (JP)

(*) Notice: Subject to any disclaimer, the term of this patent is extended or adjusted under 35 U.S.C. 154(b) by 0 days.

(21) Appl. No.: 09/172,266

(22) Filed: Oct. 14, 1998

(30) Foreign Application Priority Data

Oct. 16, 1997 (JP) .............................. 9-297977

(51) Int. Cl.$^7$ ................................ A23K 1/18
(52) U.S. Cl. ...................... 424/442; 424/438; 424/535; 426/807; 514/2; 514/400; 514/419; 514/428; 514/561; 514/562; 514/563; 514/564; 514/566; 514/568
(58) Field of Search .............................. 426/2, 53, 656, 426/807; 424/442, 438, 535; 514/2, 400, 419, 428, 561–564, 566, 568

(56) References Cited

U.S. PATENT DOCUMENTS 2,703,285 A * 3/1955 Luther ........................ 514/345
5,795,585 A * 8/1998 Ikeda et al. .................. 424/438
5,922,766 A * 7/1999 Acosta et al. ............... 514/561
6,031,000 A * 2/2000 Nissen et al. ............... 514/557

FOREIGN PATENT DOCUMENTS

JP      60-234551      11/1985
JP      3-219838       9/1991

OTHER PUBLICATIONS

Animal Science Ensminger pp. 546–549, 561–562 1978.*
Patureau–Mirand et al. Ann. Biol. Anim. Biochim Biophys. 16(4) 579–592.*
Cobon et al. Aust. J. Exp. Agric. 32(4) 435–41, '92.*
Auboiron et al. J. Dairy Sci. 77(7) 1870–81, '94.*
Foldager et al. J. Dairy Sci. 60(7)1095–1105, '77.*
Malouf & Walker Aust. J. Agric. Res. 32(5) 801–12, '81.*
Walker Aust. J. Agric. Res. 38(6) 1061–1070, '87.*
Pelaez et al. Aust. J. Agric. Res. 30(1) 125–134, '79.*

* cited by examiner

Primary Examiner—Neil S. Levy
(74) Attorney, Agent, or Firm—Oblon, Spivak, McClelland, Maier & Neustadt, P.C.

(57) ABSTRACT

An amino acid and/or a peptide are orally administrated to a neonatal ruminant whose fermenting function of the rumen has not yet developed thereby effecting a significant increase in the accumulation of fat between the muscle fibers as well as increase of the fattening effect during the fattening period.

18 Claims, 2 Drawing Sheets

METHOD OF FATTENING UP A RUMINANT

The present invention relates to a method of fattening up ruminants such as cattle, goat, sheep and the like. More particularly it relates to a method of fattening up the ruminants which intends to induce formation of much fat cells and enhance the fattening effect, especially increase accumulation of fat between muscle fibers during the fattening period.

PRIOR ART

As a representative example of meat wherein the accumulated amount of fat between muscle fibers is increased, the so-called marbled beef wherein fat is entered into red meat like net pattern is taken and it has being used as a high-grade meat for Japanese-style meat cooking "Sukiyaki". However, its production is to a large degree dependent upon the way in which a cattle is fattened up by feeding it with a large amount of cerials during the entire bleeding period while a great deal of labor is required such that the body of cattle is rubbed down thoroughly so as to permeate fat into meat. Moreover, some following cares are to be taken at the finishing period:

1. To give cattle pulling-motion for increase of appetite
2. Improvement in feeding it with boil-treated feed for increase of appetite
3. Increase in the feeding number with increase in the amount of feed intake
4. To prevent scours to be caused by increasing the amount of feed intake In recent year, the effect of vitamin A on the meat quality of the fattened cattle has been examined and the reduced amount of vitamin A contained in the assorted feed has been tested for improving the meat quality. But its effect has not been identified yet.

Thus, there are some problems to be solved for fattening up cattle for marbled beef use; much labor is required during the fattening period, the meat quality is to a high degree dependent upon the blood of cattle and the management cost is expensive. And accordingly it has been desired for the breeding farmer to provide a method of fattening up efficiently cattle having a good meat quality or a high marbled meat content.

Although Japanese Patent Application Kokai (Laid-open) No. 234,551/1985 discloses a feed for pig which contains aminobutyric acid and tryptophan, there is no description about a ruminant therein.

Also, Japanese Patent Application Kokai (Laid-open) No. 219,838/1991 discloses a broiler feed for reducing the body fat wherein valine, leucine and isoleucine as amino acid components are incorporated in each amount of 0.01 to 3.00% by weight and it is known that branched chain amino acids (valine, leucine and isoleucine) have body fat-reducing effect toward broiler. Thus there are disclosed examples of giving pig and broiler amino acids as feed and it is worthy of special mention that branched chain amino acids have body fat-reducing effect. Contrary thereto, when an amino acid is orally administrated directly to a ruminant, it is degraded or incorporated by microorganisms in the rumen and is not transported to an abomasum whereafter it is digested and absorbed. For this reason, attempts have been made to administrate to the ruminant an amino acid in the form of being coated with a hydrophobic protecting substance which is stable in the rumen of the ruminant and which makes it possible to release it in the abomasum. In the prior art amino acid administration it has been applied to ruminant of a year old or over whose function as the rumen has developed. And there have been no example of amino acid administration to the neonatal ruminant whose fermenting function of the rumen has not yet developed.

SUMMARY OF THE INVENTION

An object of the present invention is to provide a simple and convenient method of fattening up a ruminant which is very effective to cause a significant increase in accumulation of fat between muscle fibers during the fattening period.

According to the present invention feed intake of the ruminant is increased and the fattening effect may be achieved during the fattening period. The nutrients are accumulated as the body fat, especially the accumulation of fat between the muscle fibers is significantly enhanced. Thus the present invention is expected to greatly contribute to the increase in the productive performance of the marbled meat.

DETAILED EXPLANATION OF THE INVENTION

As a result of having ardently studied to achieve the above object, we have now found that if an amino acid and/or a peptide had been orally administrated continuously or at interval to a neonatal ruminant whose fermenting function of the rumen has not developed yet, higher fattening effect may be achieved at the subsequent fattening period than control one not received any amino acid and/or peptide, and that the accumulated amount of fat between muscle fibers is increased significantly. The present invention was based on the above findings.

That is, the present invention is a method of fattening up a ruminant which comprises orally administrating an amino acid and/or a peptide continuously or at interval to a neonatal ruminant whose fermenting function of the rumen has not yet developed, thereby effecting the enhance of accumulation of fat between muscle fibers during the fattening period, and an additive for a neonatal ruminant feed which comprises an amino acid(s) and/or a peptide(s).

As an amino acid which may be used in the present invention, a glycogenic amino acid and a branched chain amino acid are preferred. Examples of the glycogenic amino acid include asparagine, aspartic acid, lysine, methionine, proline, hydroxyproline, histidine, glycine, cystine, cysteine, alanine, serine, threonine, glutamine, valine, leucine and isoleucine. Also, examples of the branched chain amino acid include valine, leucine and isoleucine. Especially, the use of the branched chain amino acid is preferable from a standpoint of increased effect with respect to the accumulation of fat between muscle fibers.

These amino acids may be ones prepared by either synthetic or fermentation process. They may also be free amino acids prepared by hydrolyzing a protein. Mixture of these amino acids may also be used. Although free amino acids prepared by hydrolyzing a protein contain other amino acids than glycogenic amino acids in some cases, a fraction containing a large amount of glycogenic amino acids may be separated by the conventional separation process such as chromatography for use in the present invention. However, the amino acid mixture containing other amino acids than glycogenic amino acids may be applied to the present invention without necessity of separating other amino acid therefrom.

The peptide may be either one prepared by a synthetic process or one prepared by hydrolyzing a protein. Among these peptides, particularly ones containing a large amount of glycogenic amino acid or branched chain amino acid as the amino acid residue are preferred. However, even if the peptide contains other amino acid residues than glycogenic amino acid and branched chain amino acid, it may be used without accompanying any problems. As the protein source for use as the raw material, vegetable protein such as soybean protein and animal proteins derived from pig and cattle may be taken.

As to molecular weight of the amino acid and peptide which may be used in the present invention, 2,000 or less is preferable, and 1,000 or less is more preferable. These amino acid and peptide may be nutritionally and biologically acceptable derivatives or salts. For example, amino acid salts such as sodium aspartate, lysine hydrochrolide, cysteine hydrochloride and the like may be taken.

The administration period of the amino acid and/or peptide is the age of neonatal ruminant whose fermenting function of the rumen in the ruminants such as cattle, goat and sheep has not yet developed. The age of neonatal ruminant whose fermenting function of the rumen has not yet developed means a period of from a day after the birth until the function of the rumen develops (the function of the rumen develops completely and thereby the fermentation therein starts and the rumination initiates with intake of solid feed such as grass). Usually, about 2 to 3 weeks from a day after the birth become the administration period.

The amount administrated of the amino acid and/or peptide may be about 1~10 g/kg of body weight per day, and preferably 1~4 g/kg of body weight per day with consideration of the effect and economical point. The total amount to be administrated of the amino acid and/or peptide per day may be given the neonatal ruminants at one stroke or in portions of 2~3 times per day. However, it is preferable to administrate them continuously at least one time a day during the period.

As to the administration method, the amino acid and/or peptide are dissolved or suspended in water, or breast or powdered milk from any sources and the resultant solution or suspension is subjected to oral administration to a neonantal ruminant. The amino acid component may be used singly or as mixture of two or more of the amino acids stated in the above. It is not necessary to use the highly purified amino acid and it may be one containing the amount required of the amino acids stated in the above. Also, other additives such as vitamins, minerals, sugars may be added depending on the necessity.

As explained in the above, the present invention provides a feed additive comprising an amino acid and/or a peptide which is effective to increase the accumulation of fat between the muscle fibers during the fattening period when they had been orally administrated to a baby ruminant whose function as the rumen has not yet developed.

The present invention is illustrated in more details with reference to the following examples.

EXAMPLE 1

The Fattening Test By Administration of the Amino Acid to Sheep

1. Test Animal

The following 4 castrated sheep which were born and bred in the stock farm affiliated to the Faculty of Agriculture, the University of Tokyo were used for the test.

| Amino acid Administrated | Sheep No. | Date of the Birth | Varieties | Date of Slaughter |
| --- | --- | --- | --- | --- |
| Control | 051 | 18/02/1995 | Saint Croix | 20/11/1996 |
| Control | 054 | 03/03/1995 | Saint Croix | 28/11/1996 |
| Glycogenic Amino acid | 047 | 15/02/1995 | Saint Croix | 20/11/1996 |
| Branched chain Amino acid | 061 | 06/03/1995 | Saint Croix | 28/11/1996 |

2. Amino Acid

Glycogenic amino acid: alanine, proline and glycine
Branched chain amino acid: leucine, isoleucine and valine 3. Amount Administrated of Amino Acid 3 Kinds of glycogenic amino acids or 3 kinds of branched amino acids were mixed in equal amounts and orally administrated to the test sheep one time a day in the amount of 2 g per kg of the body weight in the state of being suspended in water.

4. The Period Administrated of Amino Acid

For 2 weeks after the birth:

5. The Fattening Period

Oct. 30, 1995~until the day of slaughter

6. Feed

As feed before the initiation of fattening, the standard feed which has a mixing ratio shown in table 1 and which has been used in the stock farm affiliated to the Faculty of Agriculture, the University of Tokyo was given the test animal twice a day with consideration of the body weight.

TABLE 1

| Raw Material | Mixing Ratio |
| --- | --- |
| Dried cut grass | 47% |
| Beet pulp | 38% |
| Wheat bran | 14.7% |
| Sodium chloride | 0.1% |
| Calcium carbonate | 0.2% |

The fattening feed "Milk & Beef" [trade name, a product of National Dairy Farming Cooperatives Association (Zenrakuren)] and water were given ad libitum the test animal during the fattening period.

7. Daily Management

The health condition including occurrence of abnormality such as scours was observed every day. Any abnormality was not observed during the experimental period.

8. Items Inspected for the Carcass Were as Shown Below

Living weight

Carcass weight

Weight of fat between intestines

Weight of fat around the kidney

Weight of subcutaneous fat

Muscle weight

Bone weight

Crude fat content in the muscular tissue

Measuring Method

The longest breast muscle (M. longissimus thoracis) at 13th thoracic vertebrae was cut into a block having about 3 cm in width and stored in a refrigerator. About 5~19 g of the central part of the frozen block was cut out and dehydrated. And thereafter the crude fat was extracted with ethyl ether for assay its content.

9. Results

The test results thus obtained are summarized in table 2.

TABLE 2

Sheep carcass parts and the fat content between muscle fibers

| Amino acid Administered | Sheep No. | Living Weight at Slaughter kg | Fat between Intestines kg (% based on the Body Weight) | Carcass Weight kg | Fat around Kidney kg (% based on the Carcass) | Subcutaneous Fat kg | Muscle kg (% based on the Carcass) | Bone kg | Fat Content in the Longest Breast Muscle % |
|---|---|---|---|---|---|---|---|---|---|
| Control | 051 | 63.6 | 2.41 (3.79) | 37.88 (59.56) | 2.16 (5.70) | 7.24 (19.11) | 24.28 (64.10) | 4.12 (10.88) | 5.96 |
| Control | 054 | 58.0 | 2.42 (4.17) | 33.40 (57.59) | 2.40 (7.19) | 4.80 (14.37) | 21.34 (63.89) | 4.26 (12.75) | 6.02 |
| Glycogenic Amino acid | 047 | 63.8 | 3.44 (5.39) | 37.76 (59.18) | 2.52 (6.67) | 6.32 (16.74) | 24.56 (65.04) | 4.20 (11.12) | 7.51 |
| Branched chain Amino acid | 061 | 62.4 | 3.52 (5.64) | 36.90 (59.13) | 2.70) (7.32) | 6.34 (17.18) | 23.52 (63.74) | 4.18 (11.33) | 9.46 |

| Amino acid Administered | Living Weight at Slaughter Kg | Carcass Weight Kg | Fat between Intestines % based on the Body Weight | Carcass Weight | Fat around Kidney % based on the Carcass | Subcutaneous Fat | Muscle % based on the Carcass | Bone | Fat Content in the Longest Breast Muscle % |
|---|---|---|---|---|---|---|---|---|---|
| Control | 60.8 | 35.6 | 3.98 | 58.58 | 6.45 | 16.74 | 63.99 | 11.82 | 5.99 |
| Glycogenic Amino acid | 63.8 | 37.8 | 5.39 | 59.18 | 6.67 | 16.74 | 65.04 | 11.12 | 7.51 |
| Branched chain Amino acid | 62.4 | 36.9 | 5.64 | 59.13 | 7.32 | 17.18 | 63.74 | 11.33 | 9.46 |

As can be seen from Table 2, although there is no significant difference in the bone weight between the amino acid administration group and the amino acid non-administration group (control group), significant increase in the living weight, the carcass weight and the fat weight is observed in the amino acid administration group and there is the marked tendency especially in the fat weight.

The administration of amino acid for 2 weeks after the birth of the sheep serves to increase the feed intake, enhance the fattening effect and accumulate the nutrients as the body fat. Although the tendency is recognized between intestines, around the kidney and the subcutaneous fat, the marked increase is recognized in the crude fat content in the longest breast muscle at 13th thoracic vertebrae.

Generally, the body fat accumulates first under the skin, in the internal organs and then between the muscle fibers. The administration of the amino acid to the baby ruminant is considered to have brought about the above result as the implantating effect.

Furthermore, in the comparison between the glycogenic amino acid and branched chain amino acid administration groups, higher effect may be achieved by the branched chain amino acid administration with respect to increase in the crude fat content in the breast muscle of 13th thoracic vertebrae.

Figure 1:
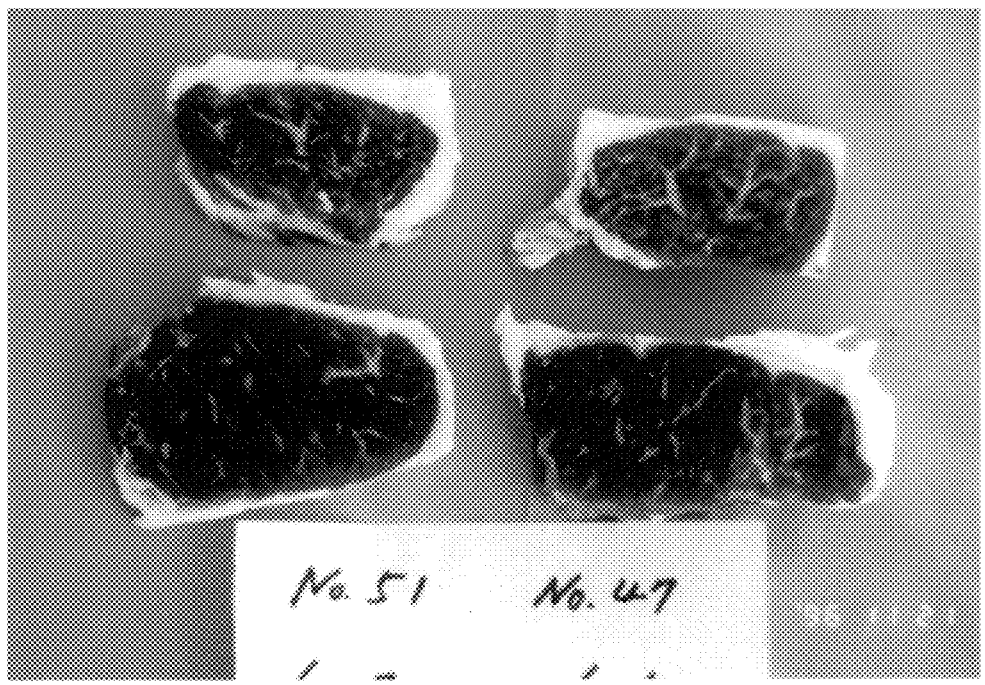
FIG. 1 is a photograph showing the cross sections of the longest breast muscle at 6th~7th and 13th thoracic vertebraes of the sheep who were slaughtered on Nov. 20, 1996, frozen and then cut up the next 21th day. In the photograph, the left two samples are ones derived from the control No. 051 while the right two samples are from the glycogenic amino acid administration No. 047. The upper sample is the cross section of the longest breast muscle at the 6th~7th thoracic vertebrae while the lower sample is one of the longest breast muscle at the 13th thoracic vertebrae.
Figure 2:
FIG. 2 is a photograph showing the cross sections of the longest breast muscle at the 6th~7th and 13th thoracic vertebrae of the sheep who were slaughtered on Nov. 28, 1996, frozen and then cut up the next 29th day. In the photograph, the left two samples are ones derived from the branched chain amino acid administration No. 061 while the right two samples are from the control No. 054. The upper sample is the cross section of the longest breast muscle at the 6th~7th thoracic vertebrae while the lower sample is one of the longest breast muscle at the 13th thoracic vertebrae.
Figure 3:
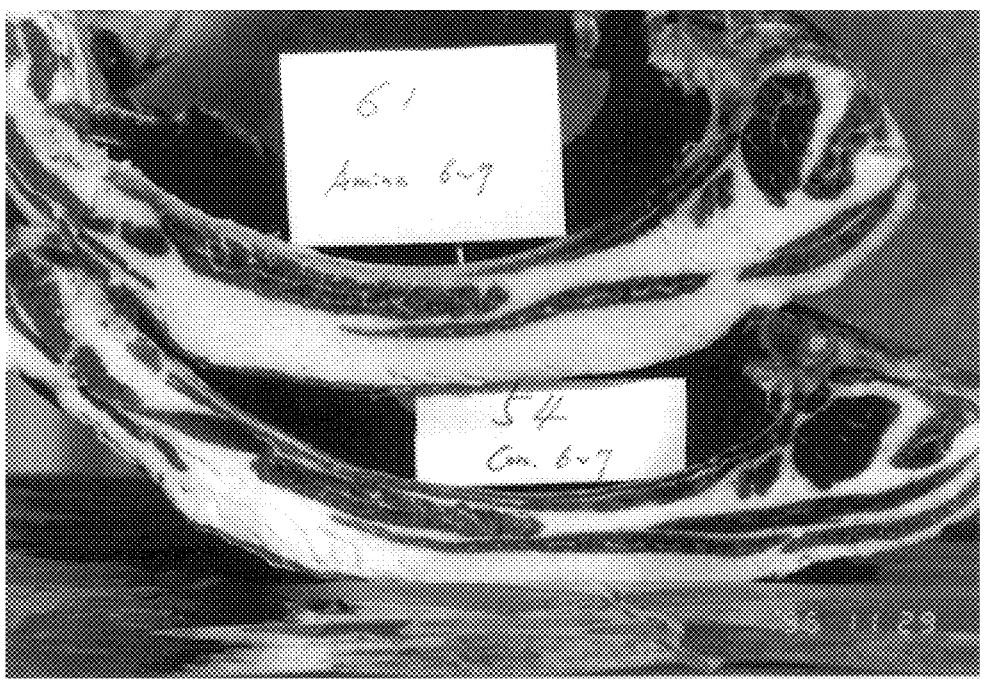
FIG. 3 is a photograph showing the cross sections of the longest breast muscle at the 6th~7th thoracic vertebrae cut downward therefrom. In the photograph, the upper sample is one derived from the branched chain amino acid administration No. 061 while the lower sample is from the control No. 054.
Figure 4:
FIG. 4 is a photograph showing the cross sections of the longest breast muscle at the 13th thoracic vertebrae cut downward therefrom. In the photograph, the upper sample is one derived from the branched chain amino acid administration No. 061 while the lower sample is from the control No. 054.

As is appearant from the photographs shown in FIGS. 1 to 4, the glycogenic amino acid and branched chain amino acid administration groups have a greater amount in the accumulation of fat betweem the muscle fibers and thicker layer in the subcutaneous fat as compared with the control group. These photographs are in agreement with the results mentioned previously, and indicate the effect of the present invention clearly.

EXAMPLE 2

The similar experiment as in Example 1 was conducted except that the glycogenic amino acids were replaced by a mixture of serine, threonine, glutamine and methionine in equal amounts or a mixture of cystine, cysteine, hydroxyproline, aruginine and histidine in equal amounts. As the results, the similar results as in Example 1, that is the increase in the accumulation of fat was observed.

EXAMPLE 3

Peptide prepared by hydrolizing soybean protein with an enzyme was subjected to an ion exchange-separation and gel filtration chromatography treatments to prepare two peptide fractions, i.e. one fraction wherein peptide has smaller molecular weight than 1,000 and the content of the branched chain amino acid residue therein is higher than 60%, and the other fraction wherein peptide has smaller molecular weight than 1,000 and the content of the glycogenic amino acid residue therein is higher than 70%.

The respective peptide fractions obtained were given the test sheep in amount of 2 g (when calculated as amino acid) based on kg of the body weight. And the similar experiments in as Example 1 were conducted. As a result, there were obtained the similar results.

What is claimed is:

1. A method of fattening up a ruminant which comprises orally administering an amino acid and/or a peptide to a neonatal ruminant whose rumen has not yet developed its' fermenting function, thereby effecting an increase of accumulation of fat between muscle fibers, wherein said amino acid and/or peptide is administered in an amount of 1–10 g/kg of body weight per day for a period of from a day after said ruminant's birth until the function of the rumen develops.

2. The method of claim 1, wherein said amino acid and/or peptide is dissolved or suspended in milk.

3. A method of fattening up a ruminant as claimed in claim 1 wherein the amino acid or peptide has a molecular weight of 2,000 or less.

4. A method of fattening up a ruminant as claimed in claim 1 comprising administering a glycogenic amino acid to said ruminant.

5. A method of fattening up a ruminant as claimed in claim 1 comprising administering a branched chain amino acid to said neonatal ruminant.

6. A method of fattening up a ruminant as claimed in claim 4 wherein the glycogenic amino acid is selected from the group consisting of asparagine, aspartic acid, lysine, methionine, proline, hydroxyproline, histidine, glycine, cystine, cysteine, alanine, serine, threonine, glutamine, valine, leucine isoleucine and mixtures thereof.

7. A method of fattening up a ruminant as claimed in claim 5 wherein the branched chain amino acid is selected from the group consisting of leucine, isoleucine valine and mixtures thereof.

8. The method of claim 1, comprising orally administering a mixture of alanine, proline and glycine to a neonatal sheep in an amount of 2 grams of mixture per kilogram of the sheep's body weight one time per day for a time period from the birth of the sheep and continuing for two weeks.

9. The method of claim 1, wherein said amino acid and/or peptide is administered 2–3 times per day.

10. The method of claim 1, wherein said amino acid and/or peptide is administered once per day.

11. The method as claimed in claim 8, wherein said mixture contains equal amounts of alanine, proline and glycine.

12. The method of claim 1 wherein said amino acid and/or peptide is administered for a period of two to three weeks from a day after its' birth.

13. The method of claim 1, wherein said amino acid and/or peptide is dissolved or suspended in water or milk prior to administering it to the ruminant.

14. The method of claim 1, wherein said amino acid and/or peptide is combined with an additive selected from the group consisting of vitamins, minerals, sugars and mixtures thereof, prior to administering it to the ruminant.

15. The method of claim 1, wherein said amino acid and/or peptide is administered in an amount of from 1–4 g/kg of body weight per day.

16. The method of claim 3, wherein said amino acid and/or peptide has a molecular weight of 1,000 or less.

17. The method of claim 1, comprising orally administering a mixture of leucine, isoleucine and valine to a neonatal sheep in all amount of 2 grams of mixture per kilogram of the sheep's body weight one time per day for a time period from the birth of the sheep and continuing for two weeks.

18. The method as claimed in claim 17, wherein said mixture contains equal amounts of leucine, isoleucine and valine.

* * * * *